A. L. DUNCAN.
ATTACHMENT FOR WHEELED VEHICLES.
APPLICATION FILED JULY 24, 1915.
1,162,585.
Patented Nov. 30, 1915.
3 SHEETS—SHEET 2.
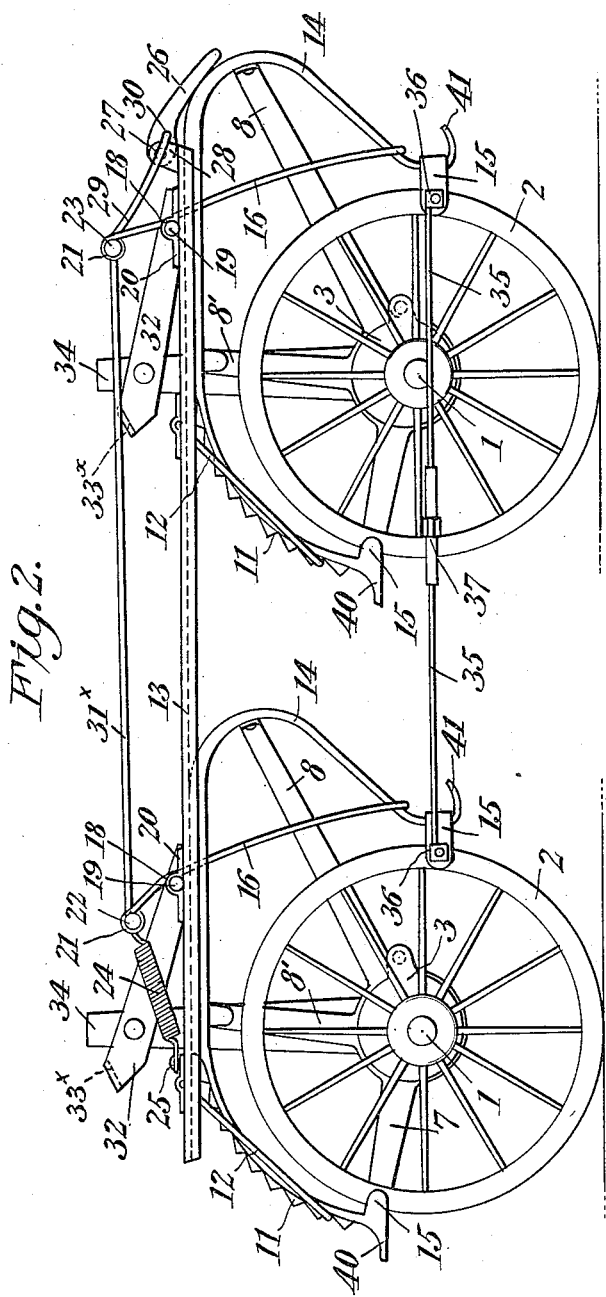
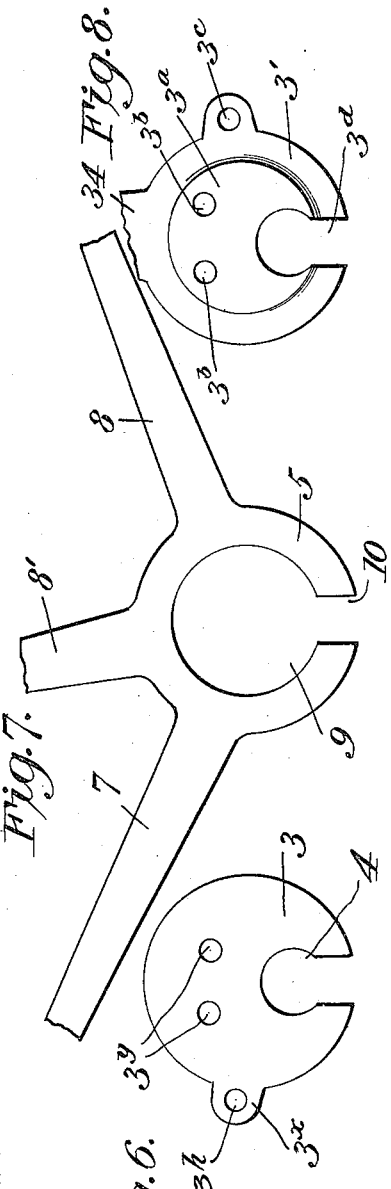
Witnesses
Fenton S. Belt
A. K. Fowler
Inventor
Albert L. Duncan
By Franklin H. Hough
Attorney A. L. DUNCAN.
ATTACHMENT FOR WHEELED VEHICLES.
APPLICATION FILED JULY 24, 1915.
1,162,585.
Patented Nov. 30, 1915.
3 SHEETS—SHEET 3.
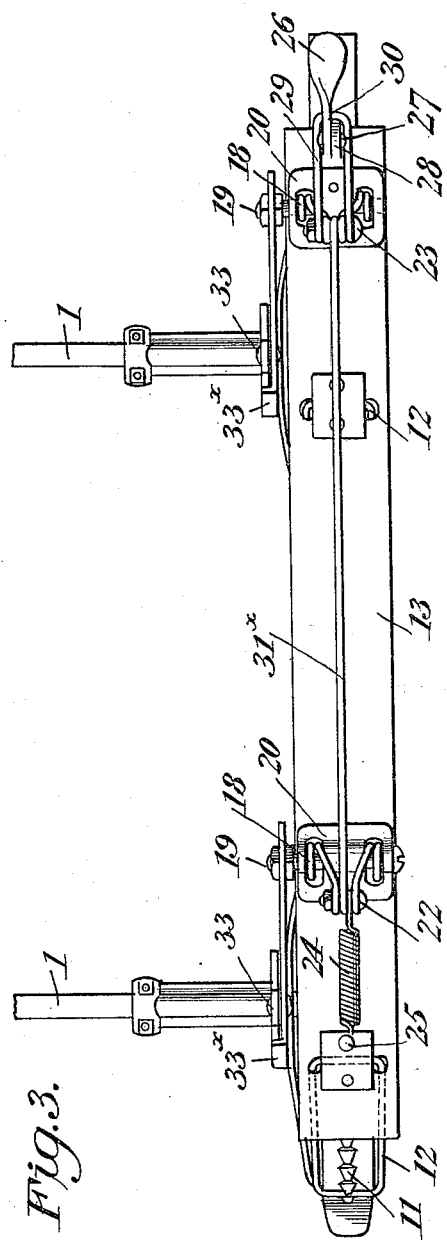
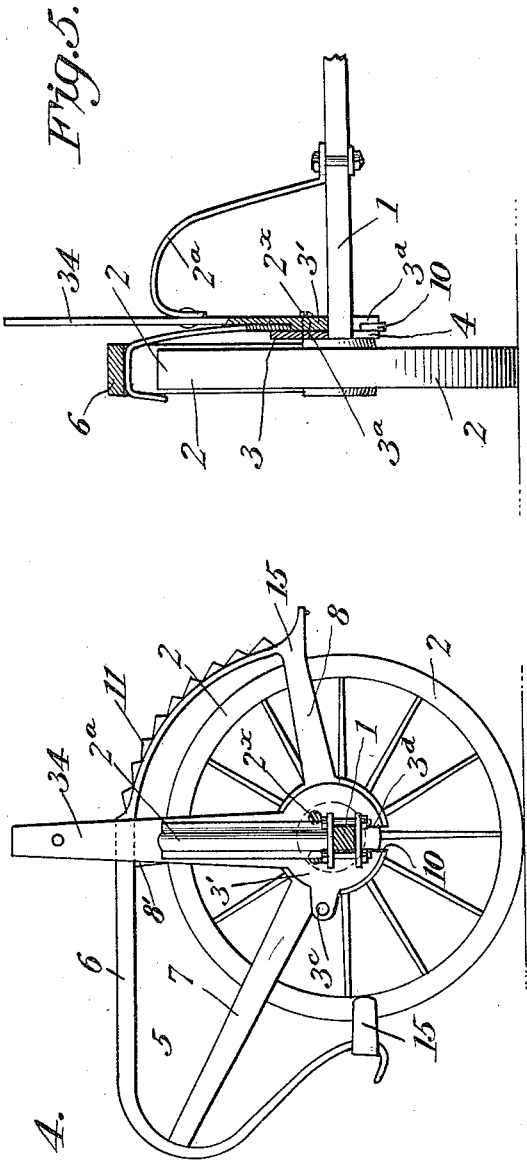
Witnesses
Inventor
Albert L. Duncan
Attorney

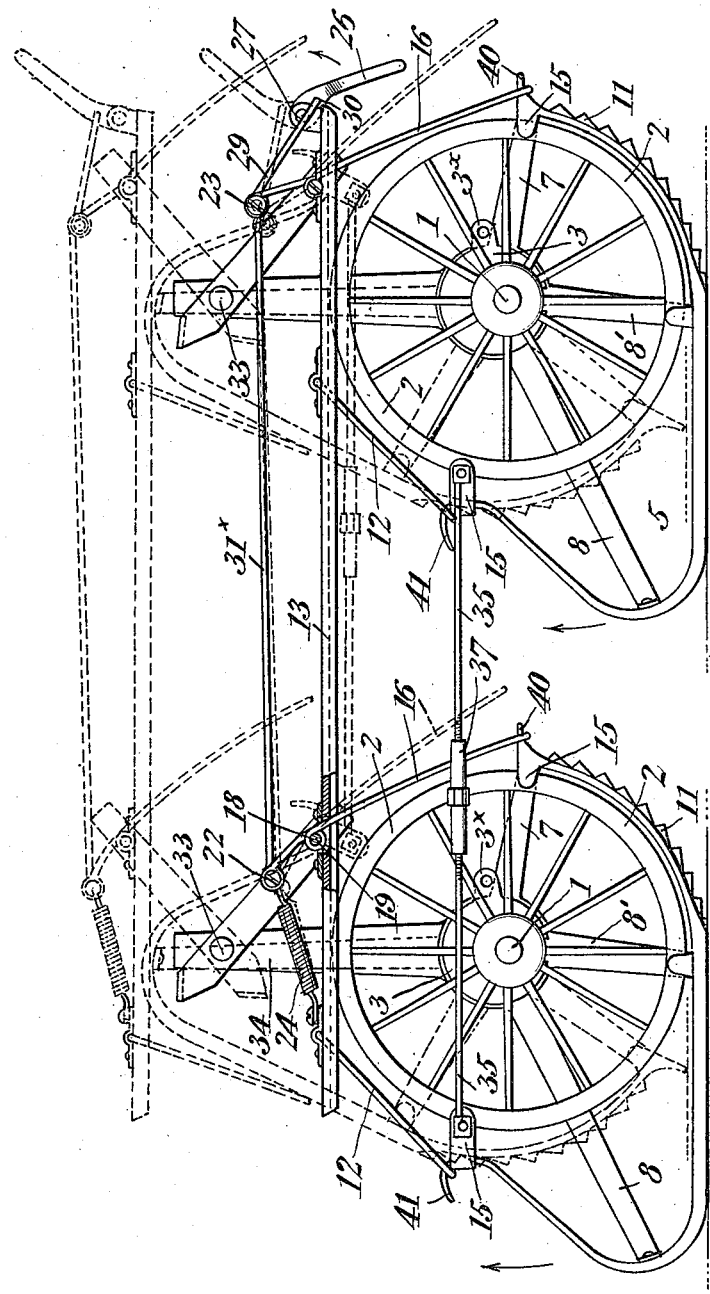

UNITED STATES PATENT OFFICE.

ALBERT LAWRENS DUNCAN, OF ELMIRA HEIGHTS, NEW YORK.

ATTACHMENT FOR WHEELED VEHICLES.

1,162,585.  Specification of Letters Patent.  Patented Nov. 30, 1915.

Application filed July 24, 1915. Serial No. 41,766.

*To all whom it may concern:*

Be it known that I, ALBERT L. DUNCAN, a citizen of the United States, residing at Elmira Heights, in the county of Chemung and State of New York, have invented certain new and useful Improvements in Attachments for Wheeled Vehicles; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in bob sleds or runners to be attached to and used in connection with baby carriages or go-carts, having two or four wheels, folding or non-folding, and consists of a simple and efficient apparatus of this nature so constructed and applied that it may be used in winter as a sled or in summer utilized as mud guard for the wheels of the vehicle.

The invention consists of an apparatus of this nature adapted to work automatically, that is the runners being so arranged as to be dropped in place by a slight pressure of the foot.

The invention consists of various details of construction, combinations and arrangements of parts which will be hereinafter fully described, shown in the accompanying drawings and then specifically defined in the appended claims.

My invention is illustrated in the accompanying drawings, in which:

Figure 1 is a side elevation of the apparatus showing the runners adjusted for use as a sled. Fig. 2 is a view showing the adjustment of the apparatus in which portions of the runners serve as mud guards when attached to a vehicle in which wheels are used. Fig. 3 is a top plan view. Fig. 4 is a side elevation of one runner and wheel and taken from the inside. Fig. 5 is a sectional view vertically and centrally through Fig. 4. Fig. 6 is a detail view of an eccentric plate for attachment to the axle of the vehicle. Fig. 7 is a detail view of the supporting part of the runner, and Fig. 8 is a detail in elevation.

Reference now being had to the details of the drawings by numeral, 1, 1 designate axles of a vehicle upon which the wheels 2 are mounted and 3 designates a plate with an eccentric opening 4 formed therein. a detail of which is shown in Fig. 6 of the drawings and provided with an apertured lug 3$^x$ and apertures 3$^y$, and which recess is adapted to receive the axle of the vehicle, as shown in Fig. 5 of the drawings. A second eccentric member, designated by numeral 3', has a cylindrical outlined boss 3$^a$ projecting from one face thereof and which is apertured as at 3$^b$ and has an apertured lug 3$^c$ projecting from the circumference thereof and an integral bar 34, and one edge of the member 3' is recessed as at 3$^d$. Said apertures 3$^e$ and 3$^x$ are adapted to receive a pin, not shown, to hold the plate 3 and member 3' together.

5 designates the frame of a runner 6, said frame having arms 7, 8 and 8', and the frame is provided with a circular-outlined recess 9 with a slot 10 opening therein, said slot being adapted to receive the axle, the outer ends of said arms 7 and 8 being connected to and adapted to brace the runner. In adjusting the parts shown in Figs. 6, 7 and 8 together, the circular-outlined portion 9 of the runner frame has a bearing about the circumference of the boss 3$^a$, the two members 3 and 3' being held together by means of screws 2$^x$, one of which is shown in Fig. 5 of the drawings, and a brace 2$^a$ is fastened at one end to the axle and its other end to the integral bar 34. The convexed edges of the runners are provided with serrations or teeth 11 which are adapted to grip the ice, sidewalk or other object, with which they come in contact as the runner is swung down over the wheels until the wheels come around to strike the surface upon which the carriage is to rest, as shown in Fig. 2 of the drawings. Each runner has oppositely disposed wings 15 which project on either side of the rims of the wheels and serve as guards to the wheels.

Bails 16 are bent to form coils 18, as shown in Fig. 3 of the drawings, and are pivotally mounted upon the pins 19 held to the plate 13 (see Fig. 2) by the straps 20 and the ends of each bail-shaped member 16 have eyes 21 formed therein and which are pivotally connected to the pins 22 and 23 respectively. A coiled spring 24 is fastened at one end to the pin 22 and its other end to a pin 25 fastened to the plate 13, shown clearly in Figs. 2 and 3 of the drawings, and a foot lever 26 is pivotally mounted upon a pin 27 carried by the lugs 28, and 29 is a bail-shaped member having eyes at its ends which are pivotally connected to the pin 23, said member 29 having pivotal connection at 30 with the foot lever 26. A rod 31ˣ is pivotally connected at one end to the pin 23 and its other end to the pin 22. Said plate 13 has a swinging pivotal movement, made necessary in the adjusting of the apparatus for use as a sled or for mud guard for the wheels of a carriage, and links 32 are pivotally connected upon the pins 18 and 19 respectively and have pivotal connection at 33 with the integral bars 34 of the runner frame. Corresponding ends of the links 32 have laterally extending bent portions 33ˣ which are adapted to contact with the adjacent edges of the integral bars 34 which limit the swinging movements of said links in one direction. Rods 35 are pivotally connected at their outer ends at points, designated by numerals 36, to the wings 15 and their inner ends are right and left threaded and engage corresponding threaded portions of the turn buckle 37, whereby the rods may be held taut and adapted to hold the parts from rattling. Said bails 16, it will be noted, engage the bowed portions of the runners and are frictionally held under pressure against the same as the lever 26 is swung down to the position shown in Fig. 2, this pressure being caused on the forward pull of the upper ends of the members 16 through the medium of the link and rod connections intermediate the lever and said ends, each member 16 being fulcrumed upon its pivotal pin. In this adjustment of the device, the bail-shaped members 12, pivotally mounted upon the plate 13, rest idly upon the teeth 11. Referring to Fig. 1 of the drawings, the bails 16 engage the hooked ends 40, while the bail-shaped members 12 engage the hooks 41 formed at the opposite ends of the runners.

In operation, when the parts are adjusted as shown in Fig. 2 and it is desired to adapt the same for use as a sleigh, the operator may release the runners by raising the lever 26 which will allow the forward ends 40 of the runners to swing down with the wheels until said ends come in contact with the floor or the surface upon which the wheels rest, and a further movement incident to the traveling of the carriage, causing the wheels to rotate, will cause the teeth of the runners to bite into the surface upon which the apparatus rests and the runners will swing underneath the wheels to the positions shown in Fig. 1 of the drawings. In this swinging movement of the runners, the plate 3 is elevated, as shown in dotted lines in Fig. 1, to allow the runners to swing thereunder, the upper movement of the plate being limited by the angled ends 33ˣ coming in contact with the edges of the members 34. When the runners have assumed their proper position, as shown in Fig. 1, adapting the apparatus for use upon snow or ice, the bail-shaped members 16 are caught underneath the hooked ends 40 and the bail-shaped members 12 made to engage the hooks 41 of the runners and the foot lever 26 may be swung back to the position shown in solid lines in Fig. 1 and which will cause the bail-shaped members 16 to tilt upon their pivot and be held frictionally against the engaged ends of the runners, while the bails 12 are in engagement with the hooked ends 41. As the runners swing down to the position shown in Fig. 2 of the drawings, the cam action of the mountings of the wheel of the runners will cause the wheel to be thrown toward and in contact with the runner and which, together with the mechanism actuated through the medium of said lever, may cause the runners to be rigidly held in their newly adjusted positions. When it is desired to throw the runners to the positions shown in Fig. 2, in which the runners are thrown above the wheels and utilized as mud guards, allowing the wheels to rotate freely, the lever 26 is thrown upward, which releases the bails 16 from the ends 40 of the runners, the carriage is moved backward and the runners will swing upward, elevating the plate and, when they come to the positions shown in Fig. 2 of the drawings, the bail-shaped members 16 are caught over the bowed portions of the runners and the lever swung down to the position shown which will cause said members 16 to hold the runners tightly in their adjustment positions, the bail-shaped members 12 resting idly upon the teeth 11.

By the provision of an apparatus embodying the features of my invention, it will be noted that, by slight alterations incident to adjustment, the same may be easily and readily applied to various forms of carts with either one, two or four wheels and may be lengthened and shortened to adapt the same for various styles of vehicles, either folding or non-folding, the adjustments being easily and quickly made to adapt it for one purpose or another.

What I claim to be new is:—

1. A sled attachment for wheeled vehicles, comprising swinging runners, bearings therefor for attachment to the mountings of the vehicle wheels and with which bearings the runners have eccentric movements, a plate, bail-shaped members pivotally mounted thereon, and lever-actuated mechanism for causing the bail-shaped members to hold the runners in different adjusted positions.

2. A sled attachment for wheeled vehicles, comprising vehicle wheels and mountings therefor, recessed members engaging said mountings, runners mounted to swing eccentrically between said members, a plate, a bail carrying member and bails pivotally mounted thereon, a lever upon the bail carrying member, connections between the bail members, and pivotal link connections between said lever and bail members and adapted to hold the latter frictionally against the runners to hold the same in adjusted positions.

3. A sled attachment for wheeled vehicles, comprising axles and wheels journaled thereon, recessed members fitted to the axles, one member in each set having a boss, a bar projecting from each member with boss thereon, runners having circular-outlined recessed portions movable about said bosses, a bail carrying plate, bail-shaped members pivotally mounted thereon and having pivotal link connections with said bars, connections between said bail-shaped members, a lever pivotally mounted upon the bail carrying plate and having link connection with the bail-shaped members and designed to hold the latter in frictional engagement with the runners.

4. A sled attachment for wheeled vehicles, comprising axles and wheels journaled thereon, recessed members fitted to the axles, one member in each set having a boss, a bar projecting from each member with boss thereon, runners having circular-outlined recessed portions movable about said bosses, a bail carrying plate having pivotal link connections with said bars, a bail-shaped member on said plate, a rod pivotally connecting the ends of the bail-shaped members, a spring connecting said rod and bail-carrying member, a lever pivotally mounted upon the latter, and pivotal link connection between the lever and rod.

5. A sled attachment for wheeled vehicles, comprising axles and wheels journaled thereon, recessed members fitted to the axles, one member in each set having a boss, a bar projecting from each member with boss thereon, runners having circular-outlined recessed portions movable about said bosses, said runners having serrations thereon, a plate having pivotal link connections with said bars, bail-shaped members pivotally mounted upon said plate and having their upper ends terminating in eyes, a rod pivotally connecting said eyes, a spring fastened at one end to said rod and the other end to said plate, a lever pivotally mounted upon the opposite end of the plate, a link pivotally connected to the lever intermediate its free and pivotal ends and connected to said rod and adapted to cause the bail-shaped members to tilt upon their pivots to frictionally engage and hold the runners in adjusted positions.

6. A sled attachment for wheeled vehicles, comprising axles and wheels journaled thereon, recessed members fitted to the axles, one member in each set having a boss, a bar projecting from each member with boss thereon, runners having circular-outlined recessed portions movable about said bosses, said runners having serrations thereon, the ends of the runners terminating in hooked portions, a plate having pivotal link connections with said bars, bail-shaped members pivotally mounted upon said plate and adapted to engage the hooked ends of the runners.

7. A sled attachment for wheeled vehicles, comprising axles and wheels journaled thereon, recessed members fitted to the axles, one member in each set having a boss, a bar projecting from each member with boss thereon, runners having circular-outlined recessed portions movable about said bosses, said runners having serrations thereon, the ends of the runners terminating in hooked portions, a plate having pivotal link connections with said bars, bail-shaped members pivotally mounted upon said plate and engaging corresponding hooked ends of the runners and provided with portions which project beyond their pivotal connection with the plate and terminating in eyes, pins in said eyes, a rod having eyes connected to said pins, a swinging lever having pivotal link connection with one of said pins, and a spring connecting the other pin with said plate.

8. A sled attachment for wheeled vehicles, comprising axles and wheels journaled thereon, recessed members fitted to the axles, one member in each set having a boss, a bar projecting from each member with boss thereon, runners having circular-outlined recessed portions movable about said bosses, said runners having serrations thereon, the ends of the runners terminating in hooked portions, a plate having pivotal link connections with said bars, bail-shaped members pivotally mounted upon said plate and engaging corresponding hooked ends of the runners and provided with portions which project beyond their pivotal connection with the plate and terminating in eyes, pins in said eyes, a rod having eyes connected to said pins, a swinging lever having pivotal link connection with one of said pins, a spring connecting the other pin with said plate, and other pivotal members mounted upon the plate and independent of said lever and engaging corresponding ends of the runners.

9. A sled attachment for wheeled vehicles, comprising axles and wheels journaled thereon, recessed members fitted to the axles, one member in each set having a boss, a bar projecting from each member with boss thereon, runners having circular-outlined recessed portions movable about said bosses, said runners having serrations thereon, the ends of the runners terminating in hooked portions, a plate, a bail-shaped member having pivotal link connections with said plate and engaging corresponding hooked ends of the runners and provided with portions which project beyond their pivotal connection with the plate and terminating in eyes, pins in said eyes, a rod having eyes connected to said pins, a swinging lever having pivotal link connection with one of said pins, a spring connecting the other pin with said plate, other pivotal bail shaped members mounted upon the plate and independent of said lever and engaging corresponding ends of the runners, and connections between the portions of the corresponding ends of the runners.

10. A sled attachment for wheeled vehicles, comprising axles and wheels journaled thereon, recessed members fitted to the axles, one member in each set having a boss, a bar projecting from each member with boss thereon, runners having circular-outlined recessed portions movable about said bosses, guards upon said runners, rods connected to the guards upon the runners at their outer ends and a turn buckle connecting their inner ends, a plate having pivotal link connections with said bars, bail-shaped members pivotally mounted upon said plate and terminating in eyes, pins in the latter, a rod connecting said pins, a lever pivoted upon the plate, and link connections between the lever and one of said pins.

11. A convertible sled for wheeled vehicles comprising, in combination with vehicle wheels and mountings therefor, bearings upon the latter, runners mounted upon said bearings, projecting bars upon said bearings, a member having pivotal link connections with said bars, said member being adapted to be raised by the runners as the wheels rotate to move the runners into different adjusted positions, and means for holding the runners in their adjusted positions.

12. A convertible sled for wheeled vehicles comprising, in combination with vehicle wheels and mountings therefor, bearings upon the latter, runners eccentrically mounted upon said bearings and serving to cause the runners to frictionally engage the wheels as the runners are thrown down to adapt the device for use as a sled, a member having pivotal link connections with projections upon said bearing members, and lever-actuated bails pivotally mounted upon said members adapted to engage the runners.

In testimony whereof I hereunto affix my signature in presence of two witnesses.

ALBERT LAWRENS DUNCAN.

Witnesses:
A. E. GOODWIN,
CHARLES HARDY.